(12) United States Patent
Tanaka

(10) Patent No.: US 7,145,737 B2
(45) Date of Patent: Dec. 5, 2006

(54) LENS APPARATUS AND VIRTUAL SYSTEM

(75) Inventor: Isao Tanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 11/103,029

(22) Filed: Apr. 11, 2005

(65) Prior Publication Data

US 2005/0225874 A1 Oct. 13, 2005

(30) Foreign Application Priority Data

Apr. 12, 2004 (JP) ............................. 2004-116799

(51) Int. Cl.
*G02B 7/02* (2006.01)
(52) U.S. Cl. .................... 359/819; 359/822; 359/823
(58) Field of Classification Search ............... 359/819, 359/821, 822, 823, 824, 825, 826, 830, 811, 359/813
See application file for complete search history.

(56) References Cited

U.S. PATENT DOCUMENTS 6,034,740 A 3/2000 Mitsui

| | | |
|---|---|---|
| 2001/0028463 A1 | 10/2001 | Iwamura |
| 2002/0122113 A1 | 9/2002 | Foote |

FOREIGN PATENT DOCUMENTS

| | | |
|---|---|---|
| EP | 0989747 A2 | 3/2000 |
| JP | 10-303838 A | 11/1998 |
| JP | 2000-270203 A | 9/2000 |
| JP | 2000-270261 A | 9/2000 |
| JP | 2000-106650 A | 11/2000 |
| JP | 2001-202530 A | 7/2001 |
| JP | 2002-032289 A | 1/2002 |
| JP | 2003-248650 A | 9/2003 |
| JP | 2004-056742 A | 2/2004 |
| JP | 2004-134950 A | 4/2004 |

*Primary Examiner*—Timothy Thompson
(74) *Attorney, Agent, or Firm*—Canon U.S.A. I.P. Div

(57) ABSTRACT

A lens apparatus includes a movable optical member, a position detection unit for detecting a position of the movable optical member, a control unit for recognizing position information obtained by the position detection unit and controlling driving of the movable optical member, and a signal input/output unit for synthesizing virtual and photographed pictures. The signal input/output unit can transmit the position information from the position detection unit linked with the movable optical member by three methods based on an analog voltage signal, a digital pulse train and data communication from the control unit.

16 Claims, 15 Drawing Sheets

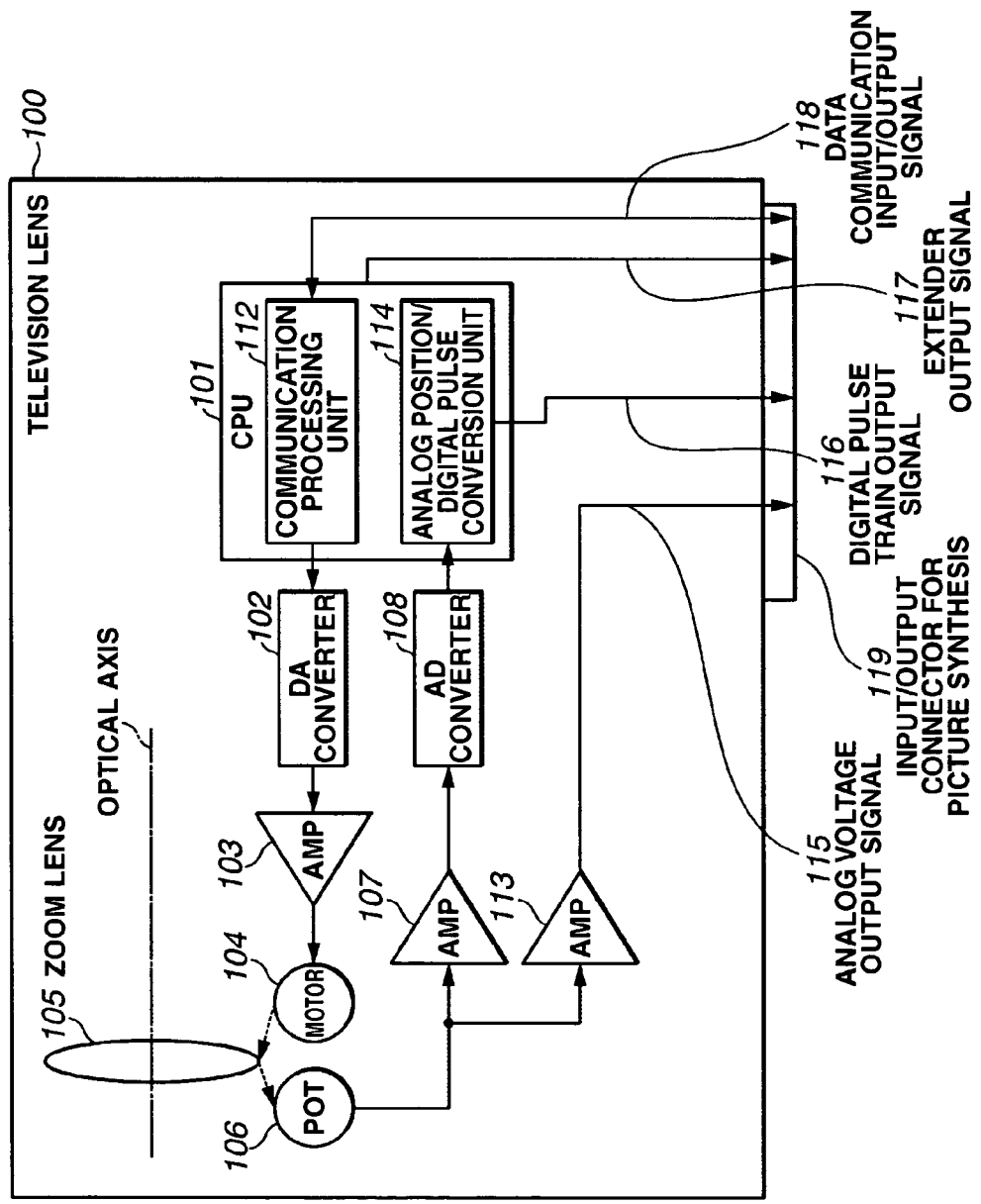

FIG.8

| PIN No. | SIGNAL NAME |
|---|---|
| 1 | +B |
| 2 | |
| 3 | |
| 4 | Zoom Encoder1 |
| 5 | Zoom Encoder2 |
| 6 | Focus Encoder1 |
| 7 | Focus Encoder2 |
| 8 | Iris Encoder1 |
| 9 | Iris Encoder2 |
| 10 | Zoom Follow |
| 11 | IE_Answer1 |
| 12 | IE_Answer2 |
| 13 | Focus Follow |
| 14 | +V2 |
| 15 | 422-RE1 |
| 16 | 422-RE2 |
| 17 | 422-TR1 |
| 18 | 422-TR2 |
| 19 | |
| 20 | GND |

US 7,145,737 B2

LENS APPARATUS AND VIRTUAL SYSTEM

BACKGROUND OF THE INVENTION

1. Field of the Invention

The present invention relates to a lens apparatus used for a photographing apparatus such as a television camera. More particularly, the invention relates to a lens apparatus used for a virtual system which synthesizes an actually shot (photographed) picture with a computer graphic (virtual picture).

2. Description of the Related Art

A television lens has conventionally been able to create a desired picture scene by electrically or manually operating and moving an optical movable member such as a zoom lens, a focus lens, an iris mechanism or an extender to cause an optical change. FIG. 10 is a schematic system diagram of a television lens. Referring to FIG. 10, a reference numeral 100 denotes a television lens, reference number 120 denotes a television camera to which the television lens 100 is fixed, reference number 121 denotes a zoom demand connected for performing zooming of the television lens 100, and reference number 122 denotes a focus demand connected for performing focusing of the television lens 100. Reference numerals 123 and 124 respectively denote demand connectors for connecting the zoom demand 121 and the focus demand 122 to the television lens 100. In the television lens operated with this configuration, a potentiometer or a rotary encoder is connected to the movable member, and used as a position detection unit of the movable member for servo driving or position displaying. The television lens is classified into a highly accurate large lens used for a studio or the like, and a highly portable handy lens designed to be used outdoors or on a shoulder. For the large lens, a digital encoder for outputting a digital two-phase signal is used as a position detection unit. For the handy lens, a potentiometer that outputs an analog voltage is generally used.

On the other hand, a system called a virtual system for synthesizing an actually shot picture with a computer graphic picture associated therewith has actively been operated (Japanese Patent Application Laid-Open Nos. 2003-248650, 2002-32289, and 2001-202530). In these systems, the television lenses such as the large lens and the handy lens are used.

In the virtual system for synthesizing pictures, a signal (indicating a zoom position, a focus position or the like) from the position detection unit linked with the movable member of the television lens is passed to the system. Accordingly, a computer graphic matched with a size of an actually shot picture and a focal position can be created by a computer in the system, and pictures can be synthesized without any uncomfortable feelings even when the zoom, the focus or the like is operated in real time.

Conventionally, there has been no dedicated or standardized method of connecting the television lens to the virtual system. The system has been completed by using existing components of the television lens side or reconstructing the television lens side in response to a request from the virtual system side. In the existing system, for connection between the television lens and the virtual system, there are three connection methods respectively based on a digital pulse train, an analog voltage signal, and data communication. The three methods will be described below.

FIG. 11 is a block diagram illustrating an operation of the virtual system in the lens on which the digital encoder is mounted as a position detection unit. Referring to FIG. 11, a reference numeral 100 denotes a television lens, reference numeral 101 denotes a CPU which is a control unit for controlling the television lens 100, reference numeral 102 denotes a DA converter for writing a command value when zoom driving is performed from the CPU 101, reference numeral 103 denotes a power amplifier for amplifying power of a command from the DA converter 102, reference numeral 104 denotes a motor driven by the power amplifier 103, reference numeral 105 denotes a zoom lens connected to the motor 104 for varying the zoom, reference numeral 109 denotes a zoom digital encoder which is a zoom position detection unit linked with the zoom lens 105, and reference numeral 110 denotes a counter for counting a two-phase pulse of the zoom digital encoder 109 to set a zoom position. FIG. 11 shows a configuration of the zoom of the television lens. However, the focus, the iris, and the extender are also similar in configuration to the zoom. With this configuration, when a command comes from the command apparatus (zoom demand) 121 connected to the television lens 100, the CPU 101 performs comparison/arithmetic operation with a current zoom position from the counter 110 to calculate a new zoom command position, and writes a result thereof in the DA converter 102. Accordingly, the CPU 101 can perform zoom position control. The two-phase pulse from the zoom digital encoder 109 is input as a zoom position signal 301 to a virtual system 200 described below. A reference numeral 200 denotes the virtual system to which the zoom position signal 301 from the television lens 100 is inputted, reference numeral 202 denotes a counter for calculating a position of the zoom lens 105 from the zoom position signal 301, and reference numeral 201 denotes a CPU for fetching a focus position, an iris position and an extender position from a focus counter (not shown) in addition to a zoom position from the counter 202, and a picture signal from a television camera (not shown) connected to the television lens 100. A computer graphic screen created in the virtual system 200 is calculated from the zoom, focus, iris and encoder positions inputted by the two-phase pulse from the television lens 100, processed to match the picture signal of the television camera, and then synthesized with the picture signal of the television camera to complete a virtual picture (synthesized picture) of no uncomfortable feeling. FIG. 12 shows in detail an interface signal 301 of a two-phase pulse for interconnecting the television lens 100 and the virtual system 200. Relative position data and absolute position data (shown) are calculated based on a digitized phase signal. Thus, the encoder used for servo control is used for connecting the lens having the digital encoder mounted thereon to the virtual system, and the signal is passed to the virtual system to enable picture synthesis. For this purpose, however, a reconstruction has been necessary for using the encoder output for the servo control and putting it out of the television lens.

Next, FIG. 13 is a block diagram illustrating an operation of the virtual system in the television lens on which a potentiometer is mounted in place of the digital encoder. Different from the configuration of the digital encoder 109 and the counter 110 shown in FIG. 11, a position detection unit of the zoom lens 105 is a potentiometer 106 based on an analog signal, and accordingly an operational amplifier 107 and an AD converter 108 are provided. In addition, though not shown, a focus, an iris and an extender are also similar in configuration to those described above. The virtual system 200 includes an operational amplifier 203 for interface alignment and an AD converter 204 in place of the counter 202. With this configuration, an interface signal between the television lens 100 and the virtual system 200 is an analog voltage signal shown in FIG. 14. Thus, the potentiometer for servo control is used for connecting the television lens having the potentiometer mounted thereon in place of the existing digital encoder to the virtual system, and a signal is passed to the virtual system to enable picture synthesis. For this purpose, however, a reconstruction has been necessary for using the potentiometer output used for the servo control and putting it out of the television lens.

Next, FIG. 15 is a block diagram illustrating an operation of the virtual system based on data communication performed in response to a request of the virtual system side. Different from FIG. 11, FIG. 15 shows a case in which the signal from the digital encoder 109 is not directly passed to the counter 202 in the virtual system 200, but a value of the counter 110 is read by the CPU 101 in the lens, and position information of the zoom, the focus or the like is passed to a communication processing unit 205 in the CPU 201 of the virtual system side through data communication by a communication processing unit 112 in the CPU 101 of the lens, thereby enabling creation of a virtual picture (synthesized picture). For the connection to the virtual system through the data communication, however, a dedicated communication line must be provided in addition to a communication line originally used for communication between the television lens and the demand, and a reconstruction has been necessary for a standard lens.

As described above, in the conventional example, there is no standard connection means (interface) for facilitating the connection with the virtual system. Accordingly, hardware and software reconstructions have been necessary for the standard television lens. Especially, reasons that the television lens cannot have standard connection means (interfaces) are a limitation placed on connection means (interfaces) depending on types of the position detection unit of the television lens, a necessity of connection means in the data communication based on dedicated communication protocol depending on a request of the virtual system side, and the like. Another problem is that additional costs and a development period are necessary because the reconstructions and the like must be made. EP-A2-989747 (corresponding to JP-A-2000-106650) discloses the information transmission of input/output signal to the virtual system by both a digital method and communication method for synthesizing the shot picture.

SUMMARY OF THE INVENTION

The present invention is directed to a lens apparatus capable of easily and inexpensively connecting with almost any virtual systems by disposing standard connection unit (interface) between the television lens and the virtual system. For this purpose, we have solved a problem of a change of a connection method depending on a type of a position detection sensor mounted on the television lens and a necessity of a communication line in addition to a demand communication line in a connection method of data communication.

In one aspect of the present invention, a lens apparatus includes a movable optical member; a position detection unit linked with the movable optical member for detecting a position of the movable optical member to obtain position information; a control unit for recognizing the position information obtained by the position detection unit and for controlling driving of the movable optical member; and a signal input/output unit for synthesizing virtual and photographed pictures. The signal input/output unit for the picture synthesis can transmit the position information from the position detection unit linked with the movable optical member by at least first, second and third transmitting methods. The first transmitting method is based on an analog voltage signal, the second transmitting method is based on a digital pulse train, and the third transmitting method is based on data communication from the control unit.

Thus, the lens apparatus can be connected to the system whichever one of the methods based on the analog voltage signal, the digital pulse train and the data communication is requested, and the system can be easily and inexpensively completed without any reconstructions or the like of the lens apparatus.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing a configuration of a television lens according to a first embodiment of the present invention.

FIG. 8 is a diagram showing an example of a virtual interface connector pin according to a fourth embodiment of the invention.

DETAILED DESCRIPTION OF THE EMBODIMENTS

Embodiments of the invention will be described in detail below with reference to the drawings.

First Embodiment

Figure 2A:
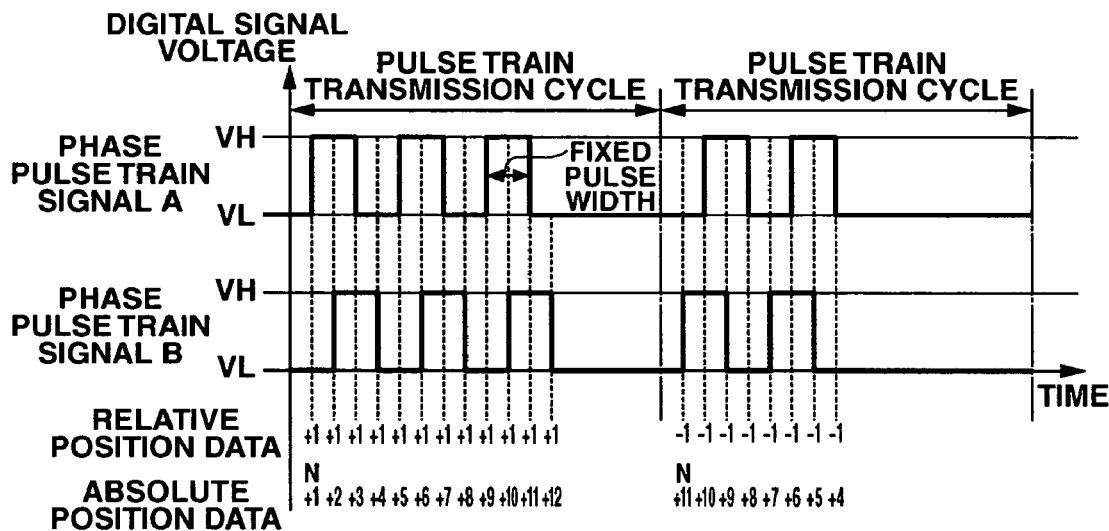
FIG. 2A is a diagram showing a digital pulse train by a phase difference signal of two phases outputted from an analog position/digital pulse conversion unit according to the first embodiment.
Figure 2B:
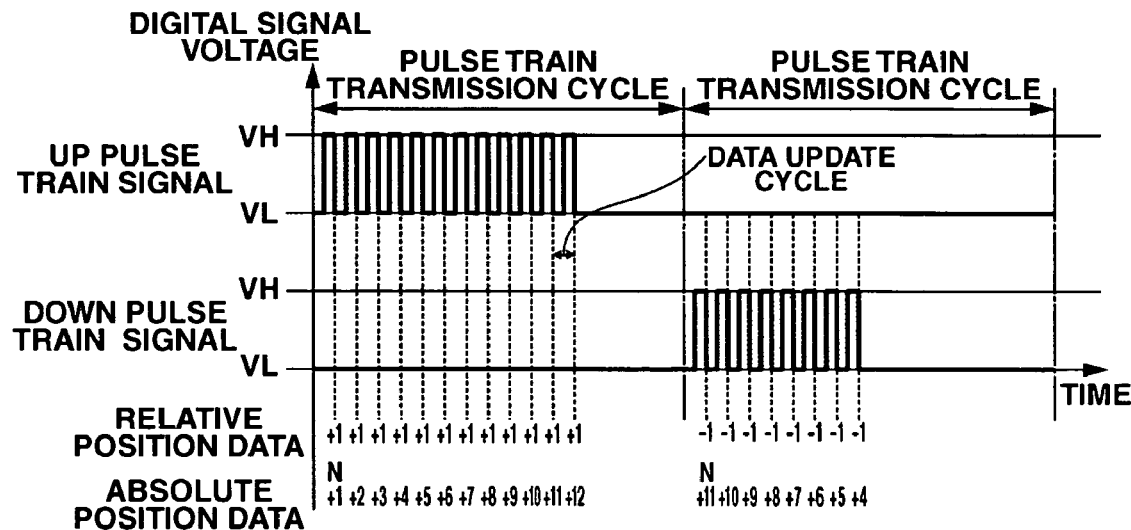
FIG. 2B is a diagram showing a digital pulse train by an up/down signal of two phases outputted from the analog position/digital pulse conversion unit according to the first embodiment.
Figure 6:
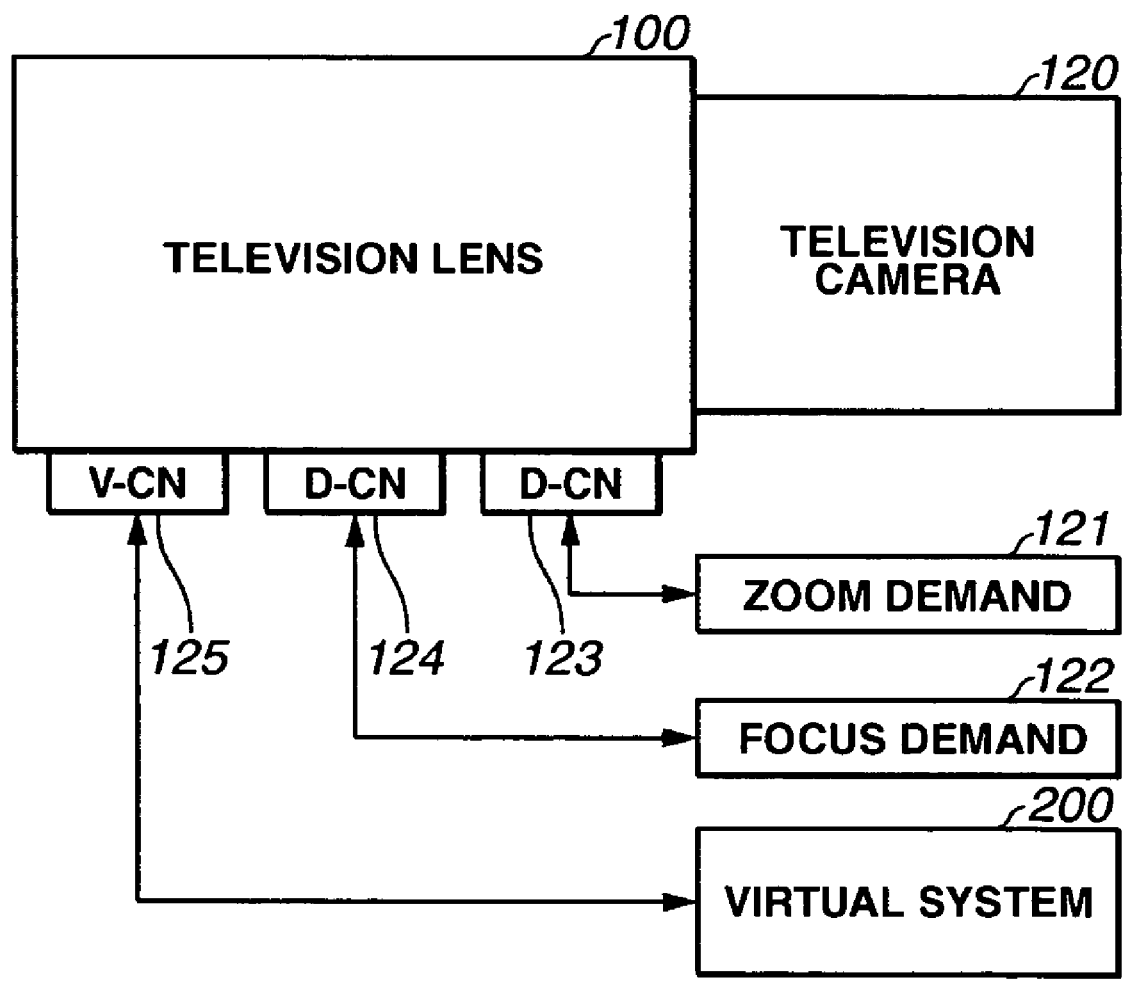
FIG. 6 is a schematic diagram of a system to which the first and second embodiments are applied.

FIG. 1 is a block diagram showing a television lens having a potentiometer mounted as a position detection unit thereon according to a first embodiment of the present invention. Referring to FIG. 1, a reference numeral 100 denotes a television lens, reference numeral 101 denotes a CPU which is a control unit for controlling the television lens 100, reference numeral 102 denotes a DA converter for writing a command value when zoom driving is performed by the CPU 101, reference numeral 103 denotes a power amplifier for amplifying power of a command from the DA converter 102, reference numeral 104 denotes a motor driven by the power amplifier 103, reference numeral 105 denotes a zoom lens connected to the motor 104 for varying zoom, reference numeral 106 denotes a zoom potentiometer which is an analog zoom position detection unit linked with the zoom lens 105, reference numeral 107 denotes an operational amplifier for aligning a circuit to fetch an analog signal from the zoom potentiometer 106 into the CPU 101, reference numeral 108 denotes an AD converter for digitizing a circuit-aligned analog zoom position signal, reference numeral 113 denotes an operational amplifier for passing the analog position signal from the potentiometer 106 as an analog voltage output signal 115 to an external virtual system 200, and reference numeral 114 denotes an analog position/digital pulse conversion unit for converting a zoom position read from the AD converter 108 into a digital pulse train signal 116 and passing the signal 116 to the external virtual system 200 (FIG. 6). FIGS. 2A and 2B show specific examples of digital pulse trains outputted from the analog position/digital pulse conversion unit 114. FIG. 2A shows a phase difference signal of two phases, and FIG. 2B shows an up/down pulse of two phases. A reference numeral 112 denotes a communication processing unit for passing position information of a zoom, a focus, an iris, an extender or the like recognized by the CPU 101 as a data communication input/output signal 118 to the external virtual system 200 through data communication. For a physical layer of the data communication, RS-232, RS-422, RS-456, USB or the like is used. A reference numeral 117 denotes an extender output passed to the virtual system through a digital output of 1 or 2 bits. A reference numeral 119 denotes a picture synthesis input/output connector in which three input/output forms to the virtual system, i.e., the analog voltage output signal 115, the digital pulse train signal 116 and the data communication input/output signal 118 are combined into one.

Figure 3:
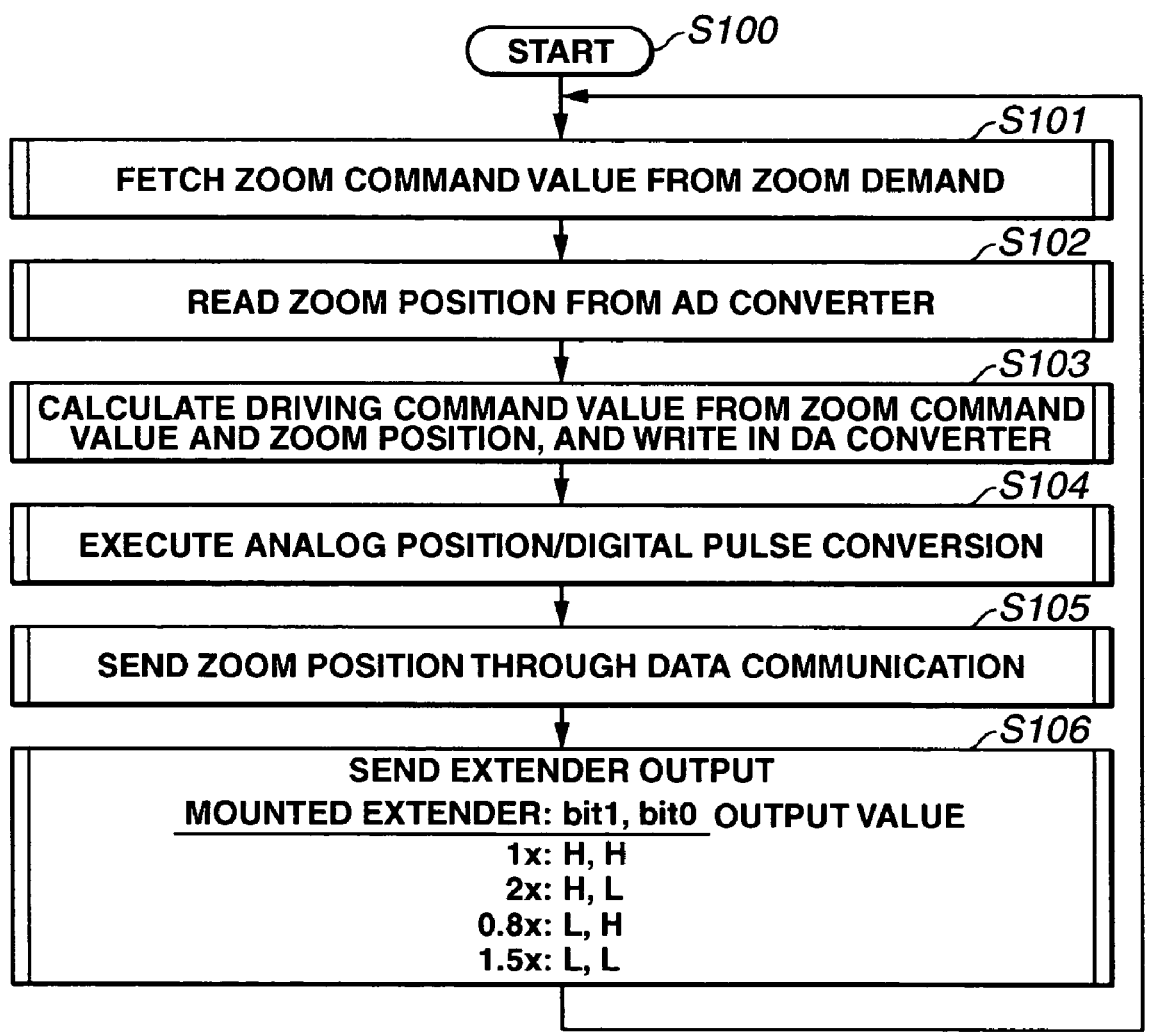
FIG. 3 is a flowchart showing an operation flow according to the first embodiment.

FIG. 1 shows only the zoom of the television lens. However, as to the focus, the iris and the extender, their configurations can be similar to the zoom. A process flow executed by the CPU 101 with this configuration is shown in FIG. 3, and an operation will be described along the flow. A step S100 is a start of the process. In the next proceeding to a step S101, a command is read from a zoom demand 121 (FIG. 6) which is a command apparatus connected to the television lens 100. Then, the process proceeds to a step S102. In the step S102, a zoom position is read by the AD converter 108, and the process proceeds to a step S103. In a step S103, a driving command for driving the zoom lens is calculated based on the zoom command value read in the step S101 and the zoom position of the step S102, and a result thereof is written in the DA converter 102. Accordingly, the operation is performed in a series of the zoom motor 104 to the zoom lens 105 to the zoom potentiometer 106. Thus, the zoom lens 105 is moved in an optical axis direction to obtain a desired picture. A next step S104 is processing executed at the analog position/digital pulse conversion unit 114 to send the digital pulse train signal 116 to the external virtual system 200. Two-phase digital pulses shown in FIGS. 2A and 2B are generated by the analog position/digital pulse conversion unit 114, whereby position information can be transmitted to the external virtual system 200. Next, a step S105 is processing executed at the communication processing unit 112 to send the zoom position read in the step S102 to the external virtual system 200 in accordance with a communication format predetermined by the communication processing unit 112, and then the process proceeds to a step S106. In the step S106, processing for sending a digital value of 1 or 2 bits compliant with a current extender value to the external virtual system 200 is executed. Then, the process returns to the start step S101, and the process is repeated. The zoom driving is accompanied by an operation of the potentiometer 106, and an analog voltage continued therefrom is passed through the operational amplifier 108 to the external virtual system 200.

The process is performed with the aforementioned specific constitution and along the operation flow, the picture synthesis input/output connector 119 is provided, and as the transmission method of the position information of the zoom, the focus, the iris or the like, the three methods based on the analog voltage signal 115, the digital pulse train signal 116 and the data communication input/output signal 118 are provided. Thus, it is possible to make easy and inexpensive connection to any virtual system 200 described above with reference to the conventional example without any reconstructions.

Furthermore, the connection method of the virtual system 200 side enables not only optional selection but also automatic selection of a connection method. In the case of the automatic selection, when the virtual system 200 side accepts the method based on the data communication input/output signal 118 and other methods, the method based on the data communication input/output signal 118 is selected because of the large amount of information to be replaced. When the two methods based on the analog voltage signal 115 and the digital pulse train signal 116 are accepted, the method based on the digital pulse train signal 116 having resistance to various noises is selected. Thus, the method optimal for the system configuration can be automatically selected, making it possible to easily configure a highly reliable virtual system 200. In the embodiment described above, the three methods based on the analog voltage signal 115, the digital pulse train signal 116 and the data communication input/output signal 118 are provided. The present invention is not limited to the three methods. Another transmitting method can be applicable, and/or at least two of the three methods may be provided based on a requirement for a general virtual system.

Second Embodiment

Figure 4:
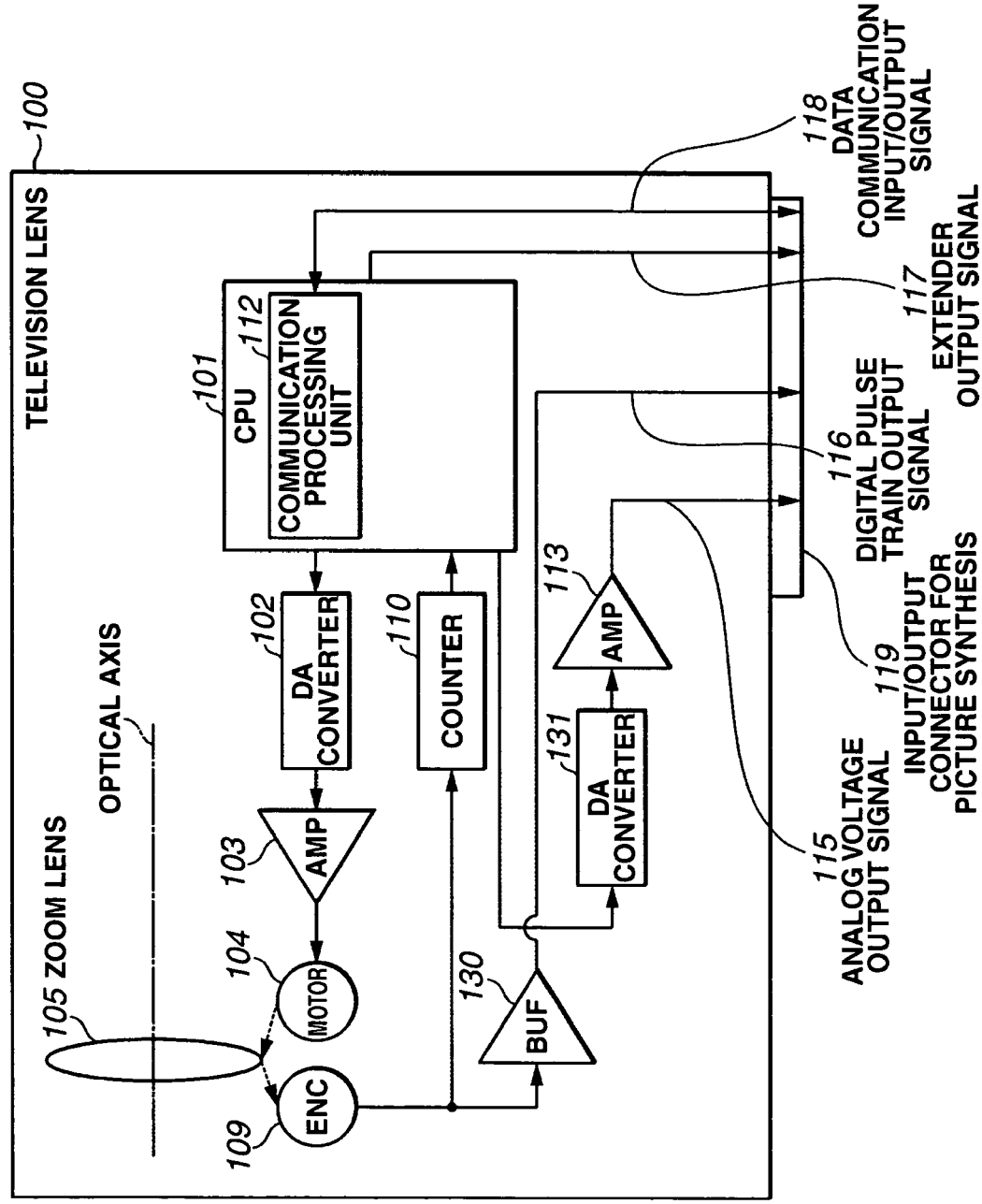
FIG. 4 is a block diagram showing a configuration of a television lens according to a second embodiment of the invention.

FIG. 4 is a block diagram showing a television lens having a digital encoder mounted as a position detection unit thereon according to a second embodiment of the present invention.

Referring to FIG. 4, as compared with FIG. 1 of the first embodiment, the zoom position detection unit is changed from the potentiometer to a two-phase digital output encoder (ENC). We omit description of components of FIG. 4 similar to those of FIG. 1. Referring to FIG. 4, a reference numeral 110 denotes a counter for counting an output value of a digital encoder 109 to obtain a current value, reference numeral 130 denotes a buffer amplifier for converting the output value of the digital encoder 109 into a digital pulse train signal 116 to be sent to an external virtual system, and reference numerals 131 and 113 respectively denote a DA converter and an operational amplifier for converting a zoom digital position read from the counter 110 by a CPU 101 into an analog voltage output signal 115 and sending it to the external virtual system 200.

Figure 5:
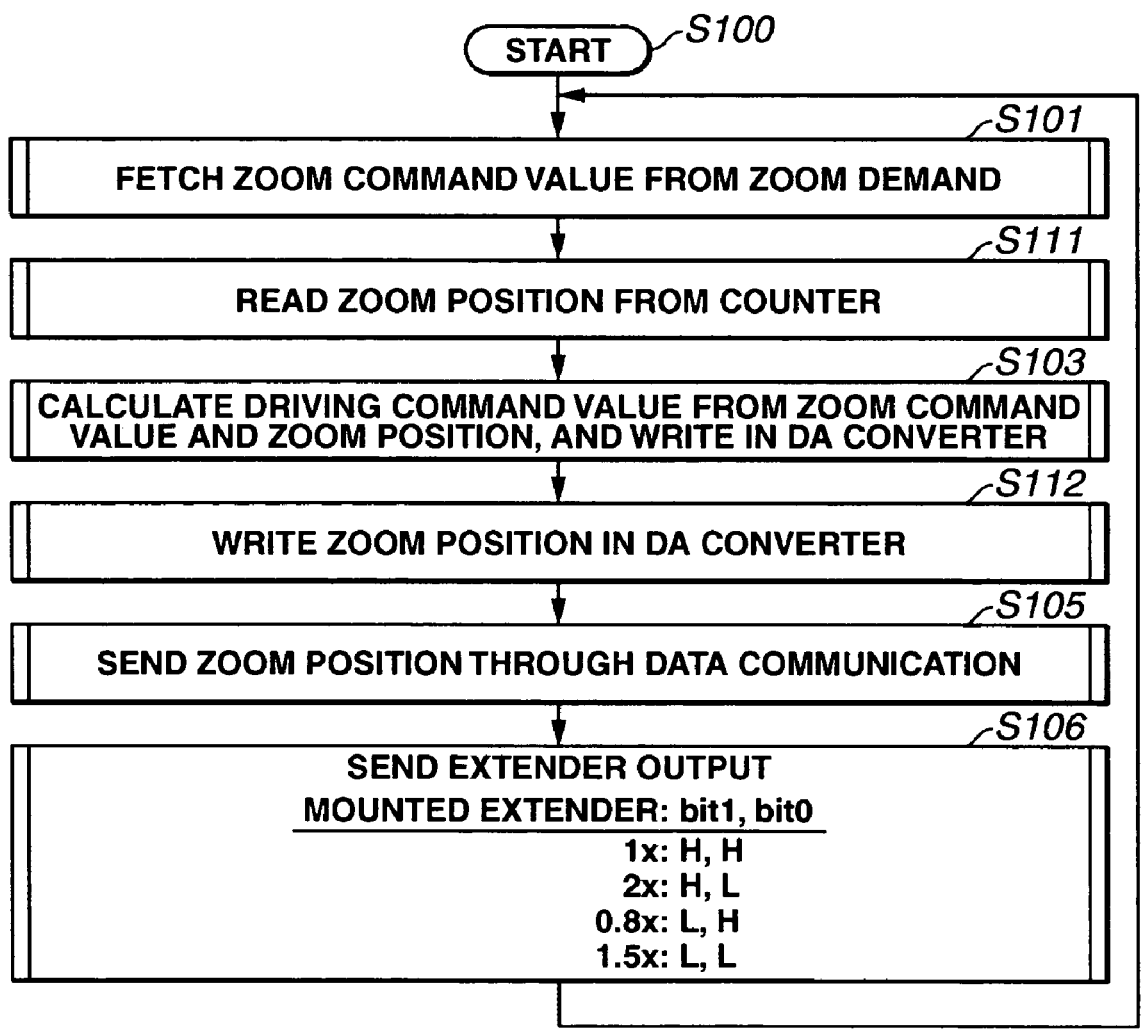
FIG. 5 is a flowchart showing an operation flow according to the second embodiment.

A process flow executed by the CPU 101 with this configuration is shown in FIG. 5, and an operation will be described along the flow. A step S100 is a start of the process. In a next step S101, a command is read from a zoom demand 121 which is a command apparatus connected to a television lens 100. Then, the process proceeds to a step S111. In the step S111, a zoom position is read from the counter 110, and the process proceeds to a step S103. In the step S103, a driving command for driving a zoom lens 105 is calculated based on the zoom command value read in the step S101 and the zoom position read in the step S111, and a result thereof is written in the DA converter 102. Accordingly, the operation is performed in a series of a zoom motor 104 to the zoom lens 105 to the digital encoder 109. Thus, the zoom lens 105 is moved in an optical axis direction to obtain a desired picture. In a next step S112, the zoom position read in the step S111 is written in the DA converter 131 to send an analog voltage output signal 115 through the operational amplifier 113 to the external virtual system 200, and the process proceeds to a next step S105. The step S105 is processing executed at a communication processing unit 112 to send the zoom position read in the step S111 to the external virtual system in accordance with a communication format predetermined by the communication processing unit 112, and then the process proceeds to a step S106. In the step S106, processing for sending a digital value of 1 or 2 bits compliant with a current extender value to the external virtual system is executed. Then, the process returns to the start step S101, and the process is repeated. The zoom driving is accompanied by an operation of the digital encoder 109 to send a digital pulse train signal 116 which is passed through the buffer amplifier 130 to the external virtual system 200.

The process is performed with the aforementioned specific constitution and along the operation flow, a picture synthesis input/output connector 119 is provided, and as a transmission method of the position information of the zoom, the focus, the iris or the like, the three methods based on the analog voltage signal 115, the digital pulse train signal 116 and a data communication input/output signal 118 are provided. Thus, it is possible to make easy and inexpensive connection to any virtual system 200 described above with reference to the conventional example without any reconstructions.

The first embodiment is the television lens which uses the potentiometer 106 as the position detection unit, and the second embodiment is the television lens which uses the digital encoder 109 as the position detection unit. No matter what position detection unit is used, as the transmission method of the position information of the zoom, the focus, the iris or the like, the three methods based on the analog voltage output signal 115, the digital pulse train signal 116 and the data communication input/output signal 118 can be provided. It is possible to make easy and inexpensive connection to the virtual system 200 described above with reference to the conventional example without any reconstructions.

Furthermore, FIG. 6 is a system schematic diagram of the television systems of the first and second embodiments. A connector 125 for virtual system connection is provided in addition to the existing demand connectors 123 and 124. Thus, it is possible to make easy and inexpensive connection to the virtual system of the conventional example without any reconstructions.

Third Embodiment

Figure 7:
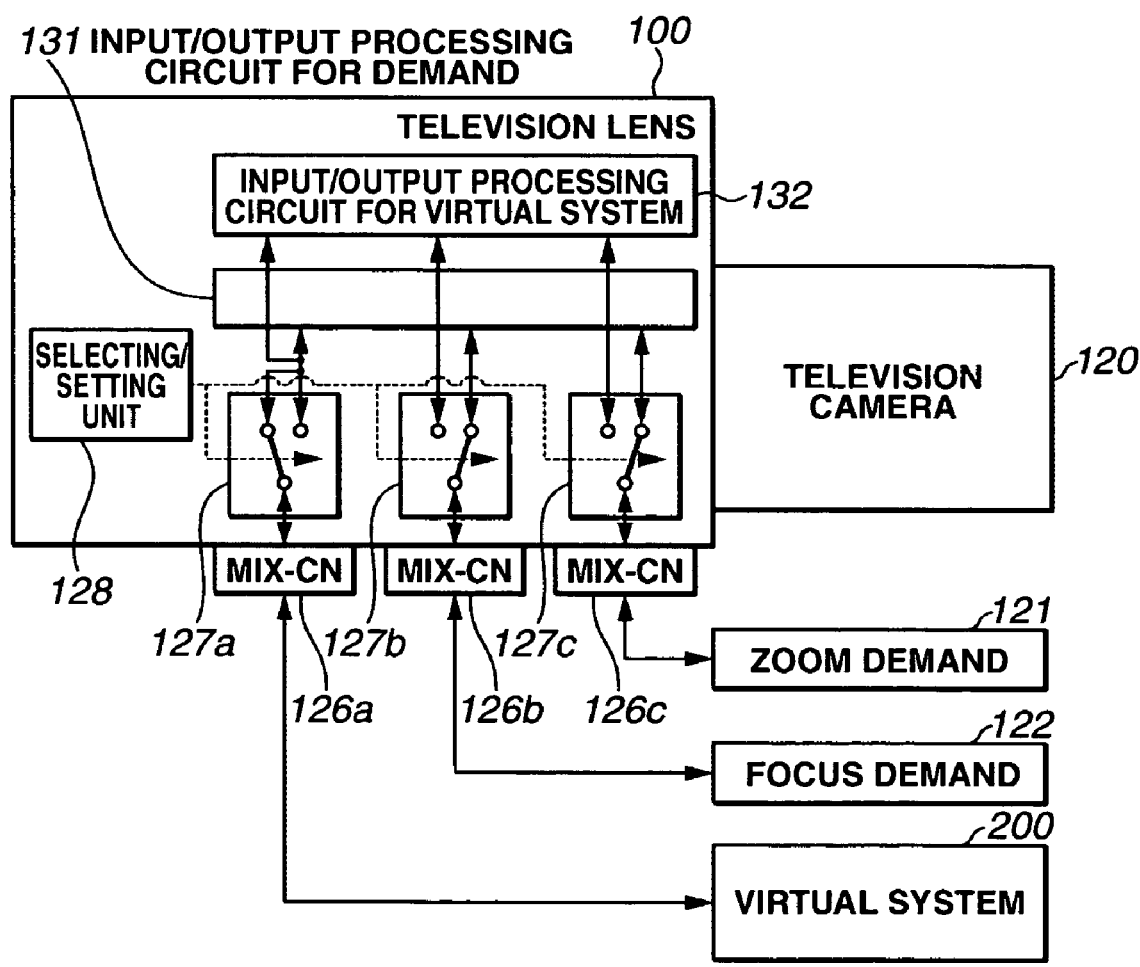
FIG. 7 is a block diagram showing a configuration of a system according to a third embodiment of the invention.

FIG. 7 is a device connection and functional block diagram of a television lens according to a third embodiment of the present invention. According to the first and second embodiments, as shown in FIG. 6, the connector 125 is provided for the virtual system connection. According to the third embodiment, however, an existing demand connector also functions as a connector for virtual system connection.

Referring to FIG. 7, reference numerals 126a to 126c denote connectors for connecting the television lens to a zoom demand, a focus demand and a virtual system, reference numeral 128 denotes a selecting/setting unit for determining the demand or the virtual system as a connection target for each of the connectors 126a to 126c, reference numerals 127a to 127c denote switching units for switching signals input/output to/from the connectors between demand inputs/outputs and virtual system inputs/outputs by the selecting/setting unit 128, reference numeral 131 denotes a demand input/output processing circuit connected when inputs/outputs from the connectors 126a to 126c are determined to be demand inputs/outputs by the selecting/setting unit 128, and reference numeral 132 denotes a virtual system processing circuit connected when the inputs/outputs from the connectors 126a to 126c are determined to be virtual system inputs/outputs by the selecting/setting unit 128. The switching units 127a to 127c switch communication protocols of data communication input/output signals 118 contained in the connectors 126a to 126c to enable normal data communication. With this configuration, the connector 126 of the television lens can be used as functions for both of the demand and virtual system connectors, and it is possible to easily and inexpensively provide the television lens which enables flexible device connection without any reconstructions. Additionally connection can be made to the virtual system without changing the number of existing connectors, and without adding any connectors to the existing lens. The selecting/setting unit 128 can be realized by assigning a selecting/setting function to one of a plurality of pins of the connectors 126a to 126c. Moreover, a similar result can be obtained by a setting which uses a setting switch or a switch and a display unit fixed to the television lens. A result is also similar when the existing connector other than the demand connector is used for another function.

Thus, with the configuration, by using the existing demand connector also as the connector for virtual system connection, flexible device connection can be made, and connection can be made to the virtual system without changing the number of existing connectors.

Fourth Embodiment

Figure 9:
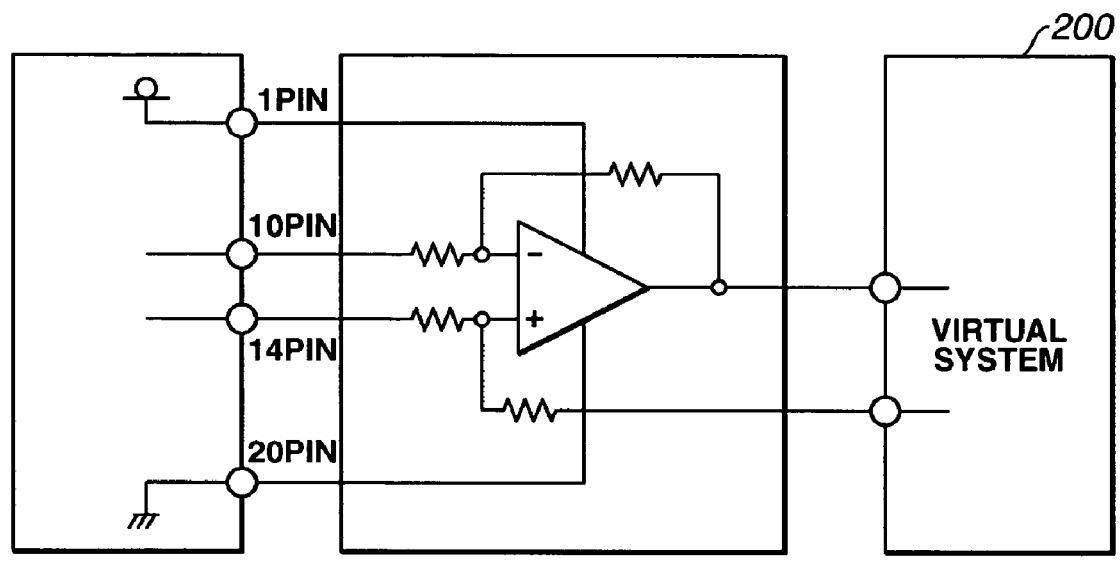
FIG. 9 is a block diagram showing an external added circuit according to the fourth embodiment.
Figure 10:
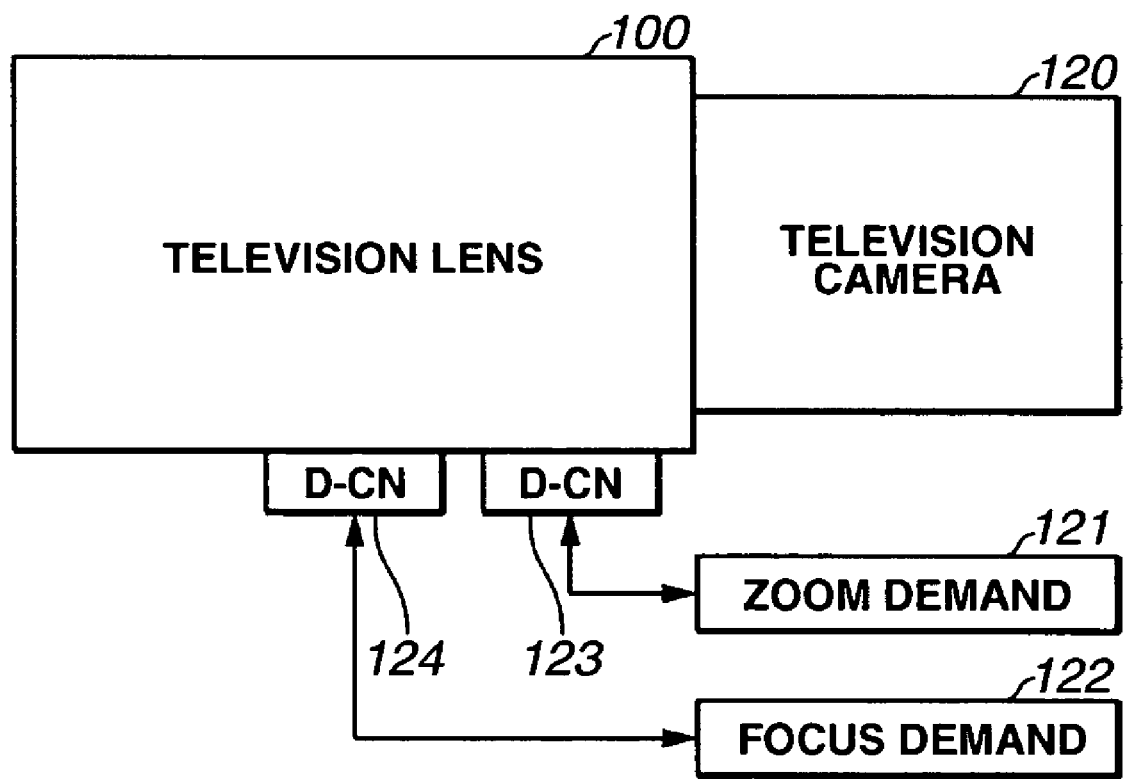
FIG. 10 is a schematic diagram of a conventional television lens system.
Figure 11:
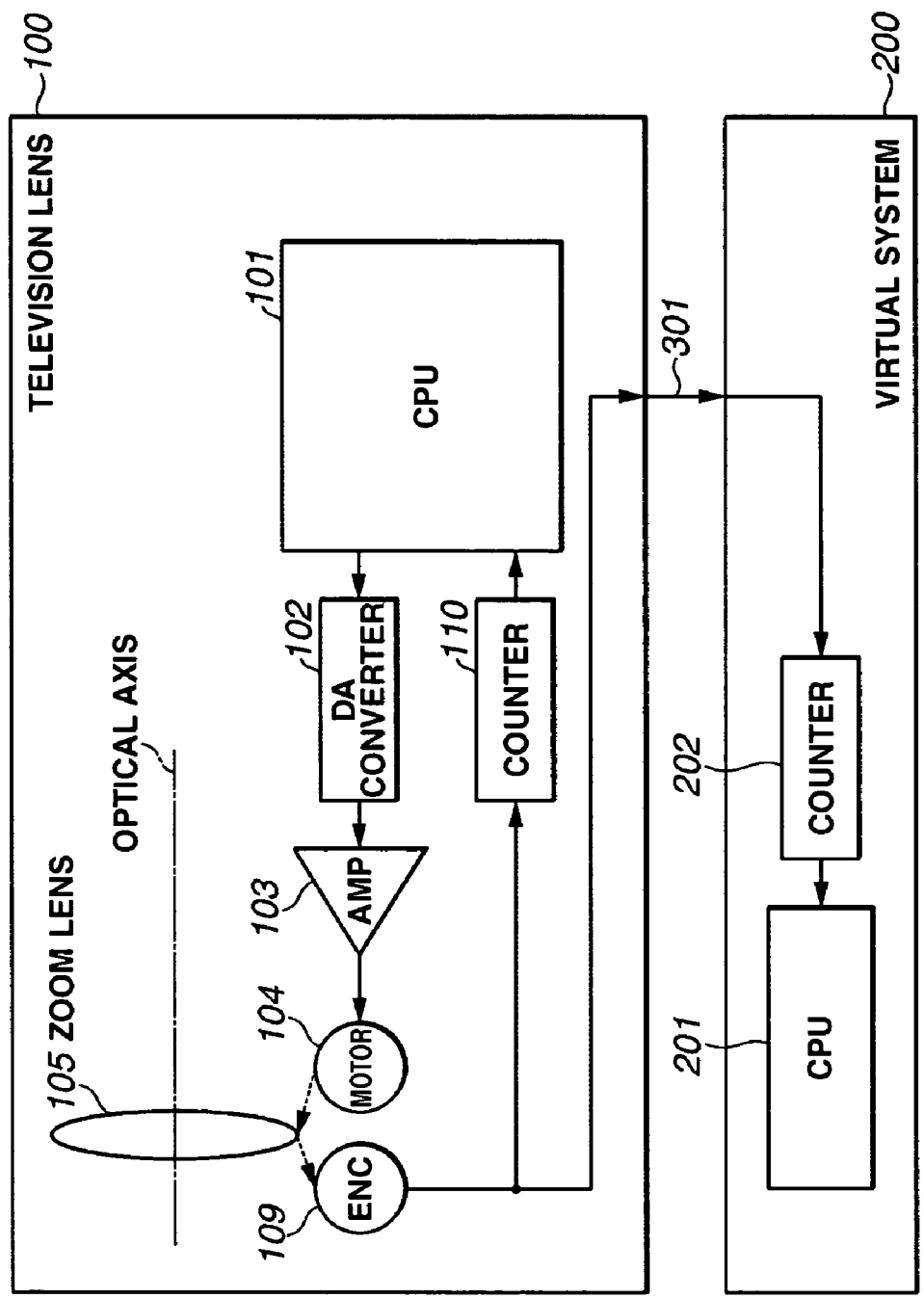
FIG. 11 is a block diagram showing a system of the television lens of the conventional example.
Figure 12:
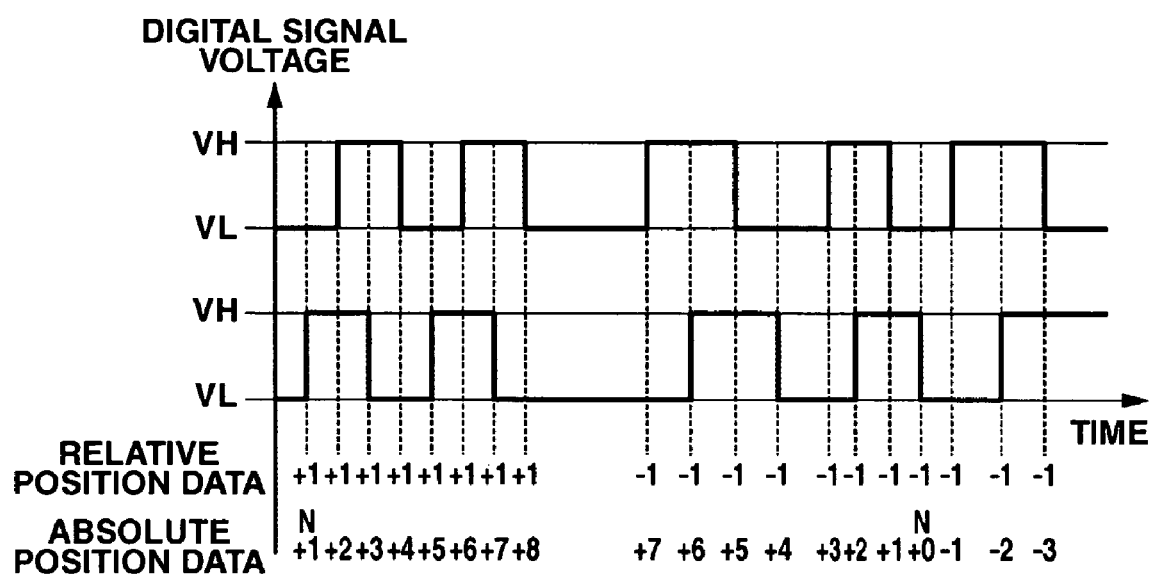
FIG. 12 is a diagram showing in detail a signal between the television lens and a virtual system in the television lens of the conventional example shown in FIG. 11.
Figure 13:
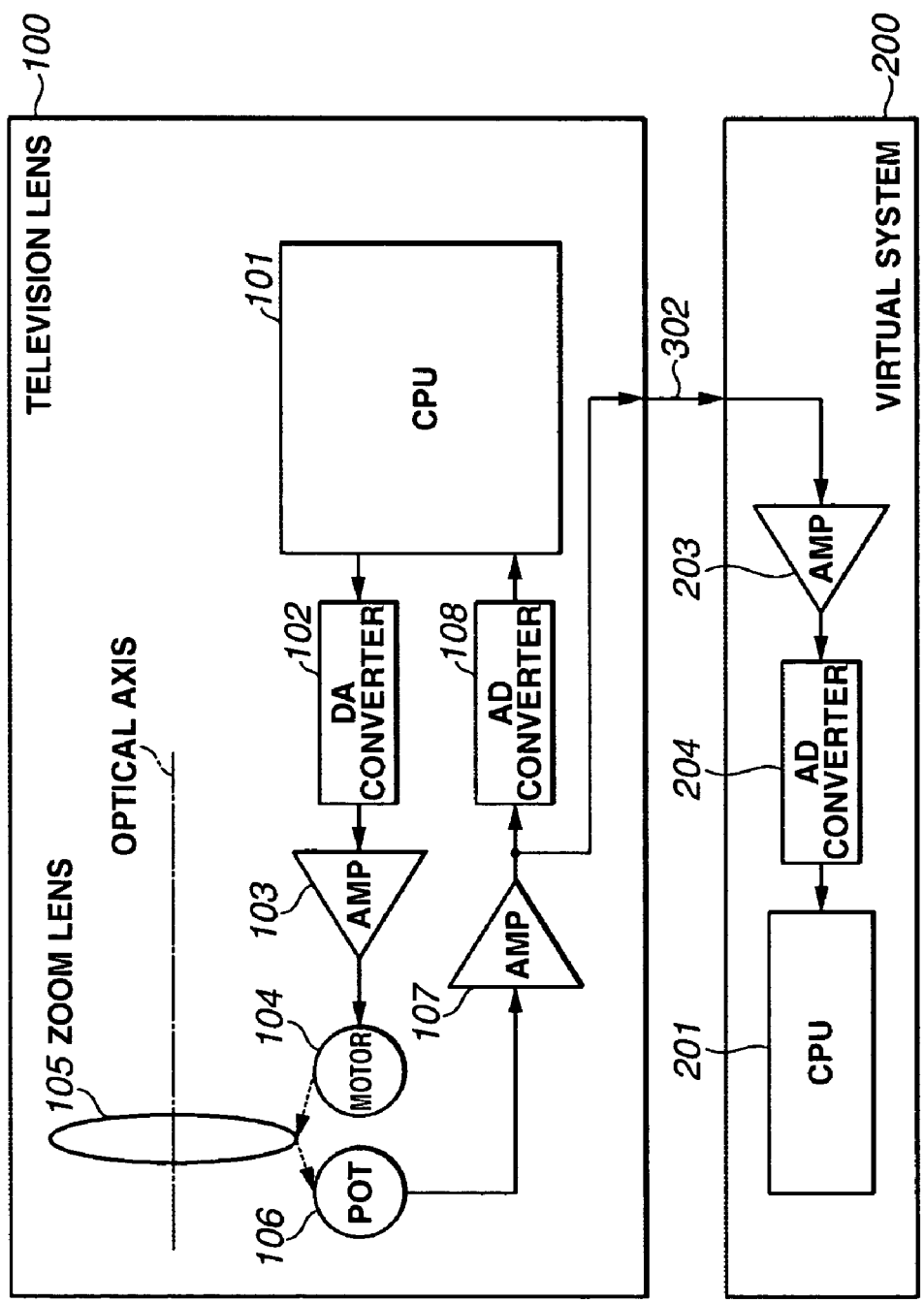
FIG. 13 is a block diagram showing a system of a television lens of anther conventional example.
Figure 14:
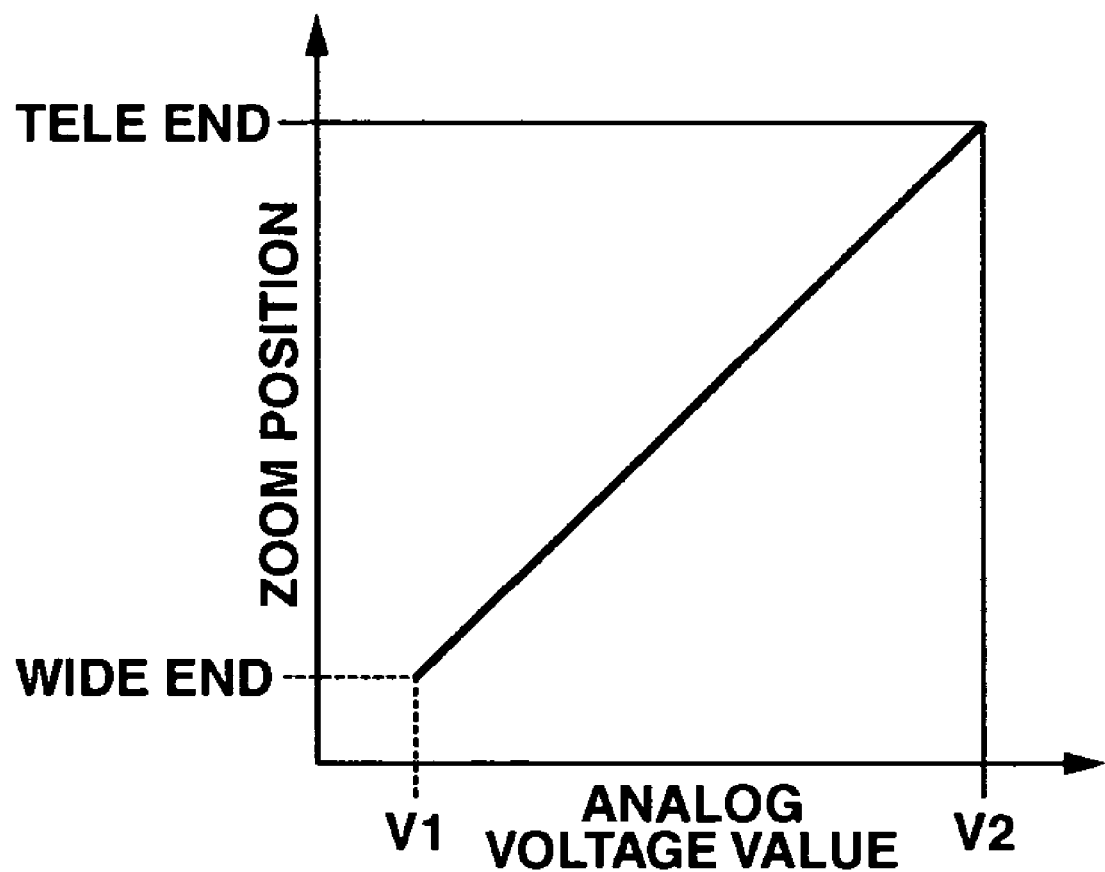
FIG. 14 is a diagram showing in detail a signal between the television lens and a virtual system in the conventional Example 2 shown in FIG. 13.
Figure 15:
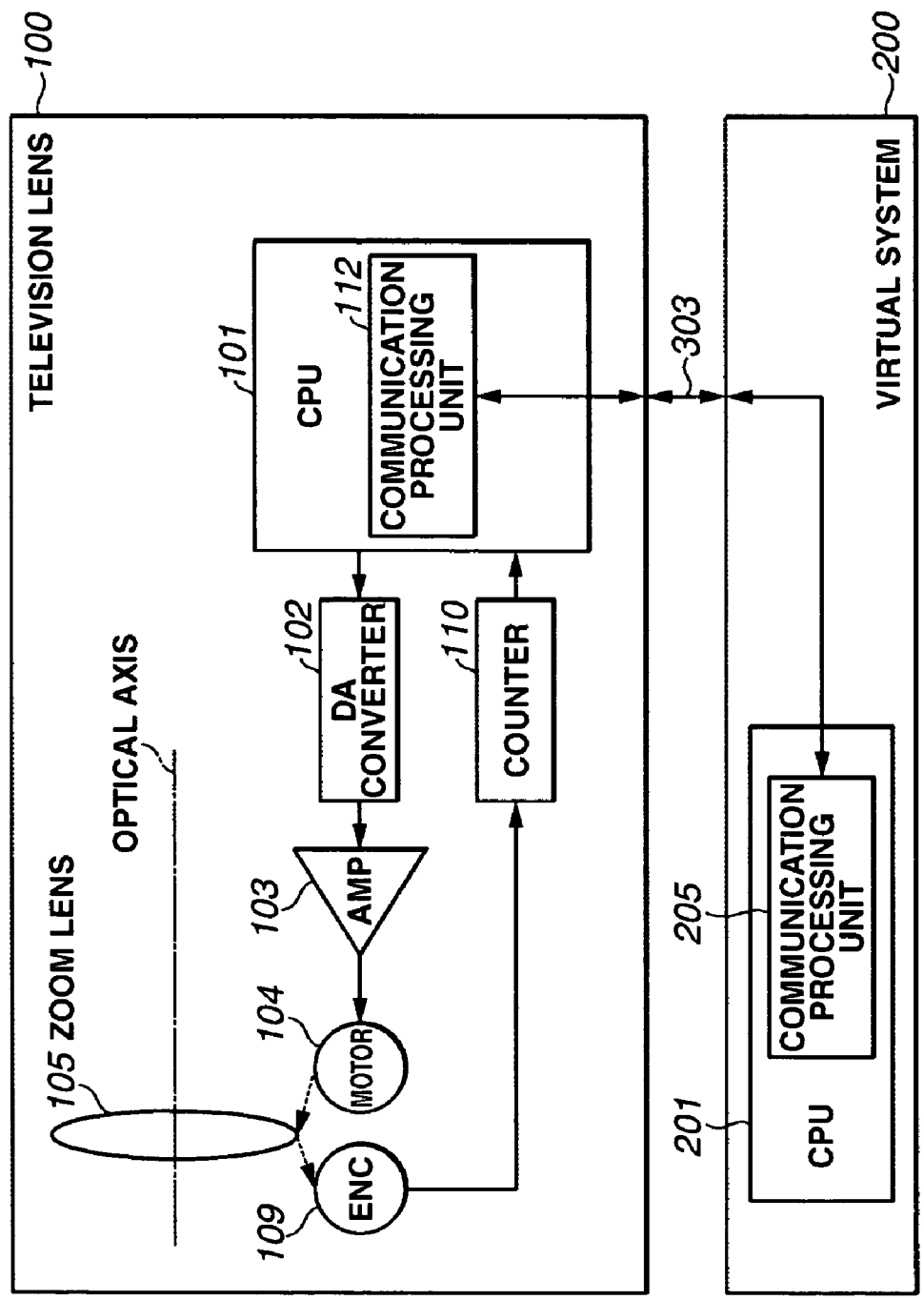
FIG. 15 is a block diagram showing a system of a television lens of yet another conventional example.

FIGS. 8 and 9 show a fourth embodiment of the present invention. FIG. 8 shows an example of a pin function of a virtual system connection connector. Referring to FIG. 8, a PIN 10 is an analog voltage output signal indicating a zoom position, and a PIN 13 is an analog voltage signal indicating a focus position. A PIN 4 and a PIN 5 are digital pulse train signals indicating zoom positions, a PIN 6 and a PIN 7 are digital pulse train signals indicating focus positions, and a PIN 8 and a PIN 9 are digital pulse train signals indicating iris positions. A PIN 15, a PIN 16, a PIN 17 and a PIN 18 are data communication input/output signals, and position information or the like of the zoom, the focus or the iris is transmitted/received when data communication is carried out with the virtual system. A PIN 11 and a PIN 12 are 2-bit digital signals indicating a loading state of the extender. A PIN 1 and a PIN 20 are power supply signals. Accordingly, for the position information of movable optical members such as the zoom, the focus and the iris in one connector, three methods based on an analog voltage output signal 115, a digital pulse train signal 116 and a data communication input/output signal 118 are provided. Thus, it is possible to make easy and inexpensive connection to any virtual system 200 described above with reference to the conventional example without any reconstructions.

FIG. 9 shows an example of a matching circuit necessary when a signal level or a reference voltage level of the virtual system 200 side is different during transmission/reception of the analog voltage output signal 115 between the television lens 100 and the virtual system 200. As shown in FIG. 9, the power supply signals PIN 1 and PIN 20 are necessary for configuring the matching circuit, and a differential amplifier circuit is configured by using the reference voltage signal PIN 14 of the analog voltage signal of the television lens side, whereby the analog voltage signal can be accurately transmitted. Additionally, even when electric insulation is necessary between the television lens 100 and the virtual system 200, it can be realized by constituting an insulating circuit of the power supply signals PIN 1 and PIN 20 and each signal line. Thus, by disposing the power supply signals PIN 1 and PIN 20 and the reference voltage signal line PIN 14 of the analog voltage signal in the virtual system connection connector of FIG. 8, even when an additional circuit is necessary between the television lens and the virtual system, it can be easily dealt with.

Furthermore, in the three methods based on the analog voltage output signal 115, the digital pulse train signal 116 and the data communication input/output signal 118, a setting unit is provided for permitting/inhibiting signal transmission/reception. The setting unit can be realized by using a setting switch or a switch or displaying unit accessory to the television lens. By this setting unit, it is possible to permit/inhibit signal transmission/reception for each of the three methods of the analog voltage signal, the digital pulse train signal and the data communication signal. Accordingly, when connection is made to the virtual system through the analog voltage signal, it is possible to reduce digital or crosstalk noises in the analog voltage signal by inhibiting transmission/reception of the digital pulse train signal and the data communication signal. By permitting only one of the methods while inhibiting the others, it is possible to achieve lower power consumption compared with the case of permitting the three methods. Therefore, by permitting/inhibiting the signal transmission/reception of each of the three methods based on the analog voltage signal, the digital pulse train signal and the data communication signal, it is possible to configure a virtual system of high noise resistance and low power consumption.

According to the embodiment, in the optical apparatus which includes the optical movable member such as the zoom, the focus, the iris or the extender for enabling optical variance, the position detection unit linked with the optical movable member, and the control unit (CPU) for recognizing the position information of the position detection, controlling the driving of the optical movable member and communicating with an operator's command/instruction unit, the signal input/output unit dedicated for picture synthesis processing is provided. The signal input/output unit can employ the three methods based on the analog voltage signal, the digital pulse trains signal and the data communication signal as the transmission unit of information from the position detection unit linked with the movable member of the zoom, the focus or the iris. Thus, the signal input/output unit dedicated for the virtual system is provided, and connection can be made to the virtual system of the connection target even when any one of the methods based on the analog voltage signal, the digital pulse train signal and the data communication signal is requested. A system can be easily and inexpensively completed without any reconstructions or the like of the television lens.

The signal input/output unit for the picture synthesis processing can employ the two methods based on the digital output represented by 1 to 2 bits and the data communication from the control unit as the transmission unit of information from the position detection unit linked with the movable member which is the extender. Thus, in the case of the extender in addition to the zoom, the focus and the iris, connection can be made to the virtual system even when any one of the methods based on the digital output and the data communication is requested. A system can be easily and inexpensively completed without any reconstructions or the like of the television lens.

The signal input/output unit for the picture synthesis processing includes the reference voltage signal line for accurately transmitting the analog voltage signal. Thus, when information is transmitted between the virtual system and the television lens through the analog voltage signal, the differential amplifier circuit with the reference voltage signal can be provided on the virtual system side. A system of high noise resistance can be easily and inexpensively completed without any reconstructions or the like of the television lens.

The signal input/output unit for the picture synthesis processing includes the power supply line for enabling signal alignment or insulation with the external device. Thus, when information is transmitted between the virtual system and the television lens through the analog voltage signal, the matching circuit necessary for matching with the voltage signal level of the virtual system side or the insulating circuit or the like necessary for electrically insulating the virtual system side from the television lens can be easily provided between the television lens and the virtual system.

The digital pulse train is one of a two-phase digitized phase signal and an up/down signal. Thus, the digital pulse train can represent a moving direction and a moving amount, facilitating connection between the television lens and the virtual system.

The methods based on the digital pulse train and the data communication include the setting unit for determining whether or not to perform input/output by the methods. Thus, high-frequency or crosstalk noises generated during digital signal transmission/reception can be prevented, better stabilizing the connection between the television lens and the virtual system.

All the signal input/output unit for the picture synthesis processing are received in one connector. Thus, a system can be easily and inexpensively completed without using the demand connector and without any reconstructions or the like of the television lens when the television lens is connected to the virtual lens through the data communication.

For all the signal input/output unit for the picture synthesis processing, the selecting/setting unit is provided for enabling use of one connector used as a normal optical apparatus, one connector used as the normal optical apparatus is a connector for connection with the operation unit (demand) of the television lens, and the control unit includes the program for determining use of the communication protocol for the operation unit (demand) of the television lens or the communication protocol for the picture synthesis system. Thus, a system can be easily and inexpensively completed without increasing the number of connectors fixed to the television lens and without improving the television lens in the connection between the television lens and the virtual system.

When a recognition unit for recognizing the three methods is provided in the external device connected to the television lens, the position information from the position detection unit linked with the optical movable member of the extender or the like in addition to the zoom, the focus and the iris is transmitted by the method of data communication from the control unit (CPU). Thus, compared with the method of the digital pulse train, a great volume of position information can be transmitted to the picture synthesis processing unit for synthesizing virtual and photographed pictures.

Moreover, a recognition unit for recognizing the two methods of the analog voltage signal and the digital pulse train is provided in the external device connected to the television lens. The position information from the position detection unit linked with the optical movable member of the extender or the like in addition to the zoom, the focus and the iris is transmitted by the method of the digital pulse train. Thus, compared with the method of the analog voltage signal, a great volume of position information can be transmitted to the picture synthesis processing unit for synthesizing virtual and photographed pictures.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-116799 filed Apr. 12, 2004, which is hereby incorporated by reference herein.

What is claimed is:

1. A lens apparatus comprising:
a movable optical member;
a position detection unit linked with the movable optical member and configured to detect a position of the movable optical member to obtain position information;
a control unit recognizing the position information obtained by the position detection unit and controlling driving the movable optical member; and
a signal input/output unit synthesizing virtual and photographed pictures,
wherein the signal input/output unit transmits the position information obtained by the position detection unit by at least first, second and third transmitting method,
wherein the first transmitting method is based on an analog voltage signal, the second transmitting method is based on a digital pulse train, and the third transmitting method is based on a data communication from the control unit.

2. A lens apparatus according to claim 1, wherein the movable optical member includes an extender linked with the position detection unit, and wherein the signal input/output unit transmits the position information obtained by the position detection unit by at least two methods based on a digital output represented by 1 to 2 bits and the data communication from the control unit.

3. A lens apparatus according to claim 1, further comprising a conversion unit, wherein the position detection unit includes an analog position detection unit, and wherein the conversion unit converts an analog position signal from the analog position detection unit into the digital pulse train.

4. A lens apparatus according to claim 1, wherein the digital pulse train represents a moving direction and a moving amount by a two-phase digitized phase signal.

5. A lens apparatus according to claim 4, further comprising a setting unit facilitating setting whether or not to output a signal by the second transmitting method of the digital pulse train.

6. A lens apparatus according to claim 1, wherein the digital pulse train represents a moving direction and a moving amount by a two-phase digitized up/down signal.

7. A lens apparatus according to claim 1, wherein the signal input/output unit includes a reference voltage signal line configured to transmit the analog voltage signal.

8. A lens apparatus according to claim 1, wherein the signal input/output unit includes a power supply line enabling at least one of signal alignment and signal insulation with an external device.

9. A lens apparatus according to claim 1, further comprising a setting unit facilitating setting whether or not to execute the data communication.

10. A lens apparatus according to claim 1, wherein the transmissions from the signal input/output unit are all received in one connector.

11. A lens apparatus according to claim 1, further comprising a selecting/setting unit enabling use of one connector used for normal photographing to receive the transmissions from the signal input/output unit.

12. A lens apparatus according to claim 11, further comprising an operation unit and one connector used for normal photographing including a connector connecting with the operation unit.

13. A lens apparatus according to claim 11, further comprising an operation unit, wherein the control unit includes a program selecting and determining use of at least a communication protocol for the operation unit and a communication protocol for a picture synthesis system based on the selecting/setting unit.

14. A lens apparatus according to claim 11, wherein, in a case where the recognition unit recognizing the first and second transmitting methods based on the analog voltage signal and the digital pulse train is externally connected, the signal input/output unit transmits the position information from the position detection unit by the second transmitting method of the digital pulse train.

15. A lens apparatus according to claim 11, wherein, in a case where the recognition unit recognizing the first, second and third transmitting methods is externally connected, the signal input/output unit transmits the position information from the position detection unit by the third transmitting method of the data communication from the control unit.

16. A virtual system comprising:
the lens apparatus according to claim 1;
a camera apparatus fixed to the lens apparatus;
a virtual generator configured to generate a virtual picture; and
a picture synthesis processing unit configured to synthesize the virtual picture with a photographed picture.

* * * * *